United States Patent
Hong et al.

(10) Patent No.: US 12,462,867 B2
(45) Date of Patent: Nov. 4, 2025

(54) MEMORY DEVICES HAVING SENSE AMPLIFIERS THEREIN THAT SUPPORT OFFSET CANCELLATION HAVING IMPROVED SENSE AMPLIFIER CHARACTERISTICS AND METHODS OF OPERATING SAME

(71) Applicant: Samsung Electronics Co., Ltd., Suwon-si (KR)

(72) Inventors: Seungki Hong, Suwon-si (KR); Jinsol Park, Suwon-si (KR); Jaeseong Lim, Suwon-si (KR); Minsoo Jang, Suwon-si (KR); Eunki Hong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 181 days.

(21) Appl. No.: 18/303,522

(22) Filed: Apr. 19, 2023

(65) Prior Publication Data
US 2024/0062806 A1    Feb. 22, 2024

(30) Foreign Application Priority Data
Aug. 22, 2022 (KR) .......... 10-2022-0104913

(51) Int. Cl.
*G11C 7/12*    (2006.01)
*G11C 11/4091*    (2006.01)
(Continued)

(52) U.S. Cl.
CPC ...... *G11C 11/4091* (2013.01); *G11C 11/4094* (2013.01); *G11C 11/4096* (2013.01)

(58) Field of Classification Search
CPC ............ G11C 11/4091; G11C 11/4094; G11C 11/4096; G11C 7/04; G11C 2207/002; G11C 11/4074; G11C 11/4076
See application file for complete search history.

(56) References Cited

U.S. PATENT DOCUMENTS

| | | |
|---|---|---|
| 6,535,025 B2 | 3/2003 | Terzioglu et al. |
| 6,781,421 B2 | 8/2004 | Terzioglu et al. |

(Continued)

FOREIGN PATENT DOCUMENTS

| | | |
|---|---|---|
| JP | 5417470 B2 | 2/2014 |
| KR | 101876459 B1 | 7/2018 |
| KR | 20180076842 A | 7/2018 |

OTHER PUBLICATIONS

Park et al. "Inverted bit-line sense amplifier with offset-cancellation capability" Electronic Letters 52(9):692-694 (Apr. 28, 2016).

*Primary Examiner* — Mushfique Siddique
(74) *Attorney, Agent, or Firm* — Wolf, Greenfield & Sacks, P.C.

(57) ABSTRACT

A method of operating a memory device includes precharging a pair of true and complementary bit lines (BL/BLB) to an equivalent voltage concurrently with precharging a pair of true and complementary sense bit lines (SABL/SABLB) to the equivalent voltage, and then transferring charge associated with offset noise from BL to SABLB concurrently with transferring charge associated with the offset noise from BLB to SABL, so that a voltage difference is established between the SABL and SABLB. Next, a logic state of a memory cell connected to BI is read by transferring charge between the memory cell and BL, concurrently with equilibrating voltages on SABL and SABLB. Then, a voltage difference between SABL and SABLB is sensed and amplified in response to activating an amplifier circuit within the sense amplifier.

18 Claims, 11 Drawing Sheets

(51) Int. Cl.
 *G11C 11/4094* (2006.01)
 *G11C 11/4096* (2006.01)

(56) References Cited

U.S. PATENT DOCUMENTS

| | | |
|---|---|---|
| 7,113,004 B2 | 9/2006 | Terzioglu et al. |
| 7,956,651 B2 | 6/2011 | Ptacek et al. |
| 10,224,093 B2 | 3/2019 | Kim et al. |
| 10,290,340 B1 | 5/2019 | Jung et al. |
| 10,541,022 B2 | 1/2020 | Kim et al. |
| 10,803,925 B2 | 10/2020 | Kim et al. |
| 11,024,365 B1 * | 6/2021 | Seo .................. G11C 11/4091 |
| 11,043,257 B2 | 6/2021 | Kim et al. |
| 11,335,385 B2 | 5/2022 | Lam et al. |
| 2009/0213673 A1 | 8/2009 | Flautner et al. |
| 2011/0267914 A1 | 11/2011 | Ishikura et al. |
| 2012/0188836 A1 * | 7/2012 | Lee .................. G11C 11/4091 |
| | | 365/207 |
| 2015/0036444 A1 * | 2/2015 | Seo .................. G11C 11/4091 |
| | | 365/210.1 |
| 2017/0069368 A1 * | 3/2017 | Woo .................. G11C 11/4094 |
| 2018/0182449 A1 * | 6/2018 | Kim .................. G11C 11/4094 |
| 2019/0096446 A1 * | 3/2019 | Lee ...................... G11C 7/062 |
| 2022/0343967 A1 * | 10/2022 | Koh .................. G11C 11/4094 |
| 2023/0238052 A1 * | 7/2023 | Shang ...................... G11C 7/12 |
| | | 365/149 |
| 2023/0238053 A1 * | 7/2023 | Shang ...................... G11C 7/12 |
| | | 365/207 |

* cited by examiner

MEMORY DEVICES HAVING SENSE AMPLIFIERS THEREIN THAT SUPPORT OFFSET CANCELLATION HAVING IMPROVED SENSE AMPLIFIER CHARACTERISTICS AND METHODS OF OPERATING SAME

REFERENCE TO PRIORITY APPLICATION

This application claims priority under 35 U.S.C. § 119 to Korean Patent Application No. 10-2022-0104913, filed Aug. 22, 2022, the disclosure of which is hereby incorporated herein by reference.

BACKGROUND

The inventive concept relates to integrated circuit memory devices and, more particularly, to memory devices having improved sense amplifier characteristics and methods of operating same.

Dynamic random access memory (DRAM) devices typically operate by writing and reading data stored as electric charges within memory cell capacitors. In a DRAM, an array of memory cells is connected with bit lines and complementary bit lines. When a read operation or a refresh operation is performed, a sense amplifier senses and amplifies a voltage difference between the bit line and the complementary bit line. Semiconductor devices constituting the sense amplifier may have different characteristics, such as different threshold voltages caused by differences in process, voltage and temperature (PVT) changes, etc. As a result, undesirable offset noise within the sense amplifier may be generated. Variations in offset noise may also be caused by variations in the power supply voltages that drive the sense amplifier during reading and writing. Accordingly, because the operating characteristics and/or sensing margins of sense amplifiers may vary in response to variations in offset noise, memory devices that adequately compensate for offset noise can have enhanced sensing margin and other operating characteristics.

SUMMARY

The inventive concept provides a memory device and a method for controlling an operation timing of a sense amplifier, which advantageously cancels offset noise based on voltage information and/or temperature information detected in the memory device.

According to an aspect of the inventive concept, there is provided a memory device including a memory cell array including a plurality of memory cells, a voltage detection circuit, which is configured to detect a power supply voltage level of the memory device and provide voltage information, a sense amplifier connected to a bit line and a complementary bit line of the memory cell array and configured to perform an offset cancellation operation to reduce an offset voltage difference between the bit line and the complementary bit line, sample and detect a voltage change of the bit line, and adjust voltages of a sensing bit line and a complementary sensing bit line based on the detected voltage change, and a control circuit configured to vary an offset cancellation time interval for which the offset cancellation operation of the sense amplifier is performed based on the voltage information.

According to another aspect of the inventive concept, there is provided a memory device including a memory cell array including a plurality of memory cells, a temperature sensor configured to sense a temperature of the memory device and provide temperature information, a sense amplifier connected to a bit line and a complementary bit line of the memory cell array and configured to perform an offset cancellation operation to have an offset voltage difference between the bit line and the complementary bit line, sample and detect a voltage change of the bit line, and adjust voltages of a sensing bit line and a complementary sensing bit line based on the sensed voltage change, and a control circuit configured to vary an offset cancellation time for which the offset cancellation operation of the sense amplifier is performed based on the temperature information.

According to another aspect of the inventive concept, there is provided an operating method of a memory device including a memory cell array, including detecting a power supply voltage level of the memory device and providing voltage information, performing an offset cancellation operation to have an offset voltage difference between a bit line and a complementary bit line connected to memory cells of the memory cell array, sampling and sensing a voltage change in the bit line, and adjusting voltages of a sensing bit line and a complementary sensing bit line based on the detected voltage change, wherein the performing of the offset cancellation operation includes varying an offset cancellation time for which the offset cancellation operation is performed based on the voltage information.

According to a further aspect of the inventive concept, a method of operating a memory device may include: (i) precharging a pair of true and complementary bit lines to an equivalent voltage concurrently with precharging a pair of true and complementary sense bit lines within a sense amplifier to the equivalent voltage, then (ii) transferring charge associated with offset noise from the true bit line to the complementary sense bit line concurrently with transferring charge associated with the offset noise from the complementary bit line to the true sense bit line, so that a voltage difference is established between the true sense bit line and the complementary sense bit line, then (iii) reading a logic state of a memory cell within the memory device by transferring charge between the memory cell and the true bit line, concurrently with equilibrating voltages on the true and complementary sense bit lines, and then (iv) sensing and amplifying a voltage difference between the true and complementary sense bit lines in response to activating an amplifier circuit within the sense amplifier.

According to a further aspect of the inventive concept, a memory device is provided with an enhanced sense amplifier. The sense amplifier includes: (i) an equalization circuit, which is electrically connected to a true sense bit line and a complementary sense bit line and responsive to an equalization signal, (ii) an amplifier circuit, which is electrically connected to the true sense bit line and the complementary sense bit line and responsive to true and complementary sensing driving signals (LA/LAB), (iii) a first isolation transistor electrically connected in series between a true bit line and the true sense bit line, and a second isolation transistor electrically connected in series between a complementary bit line and the complementary sense bit line, and (iv) a first offset cancellation transistor having a first current carrying terminal electrically connected to the true bit line, a second current carrying terminal electrically connected to the complementary sense bit line, and a gate terminal responsive to an offset cancellation signal, and a second offset cancellation transistor having a first current carrying terminal electrically connected to the complementary bit line, a second current carrying terminal electrically connected to the true sense bit line, and a gate terminal responsive to the offset cancellation signal. In addition, a control circuit is provided that is configured to generate the offset cancellation signal during an operation to reduce offset noise on the true and complementary bit lines, which precedes an operation to read a logic state of a memory cell onto the true bit line.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
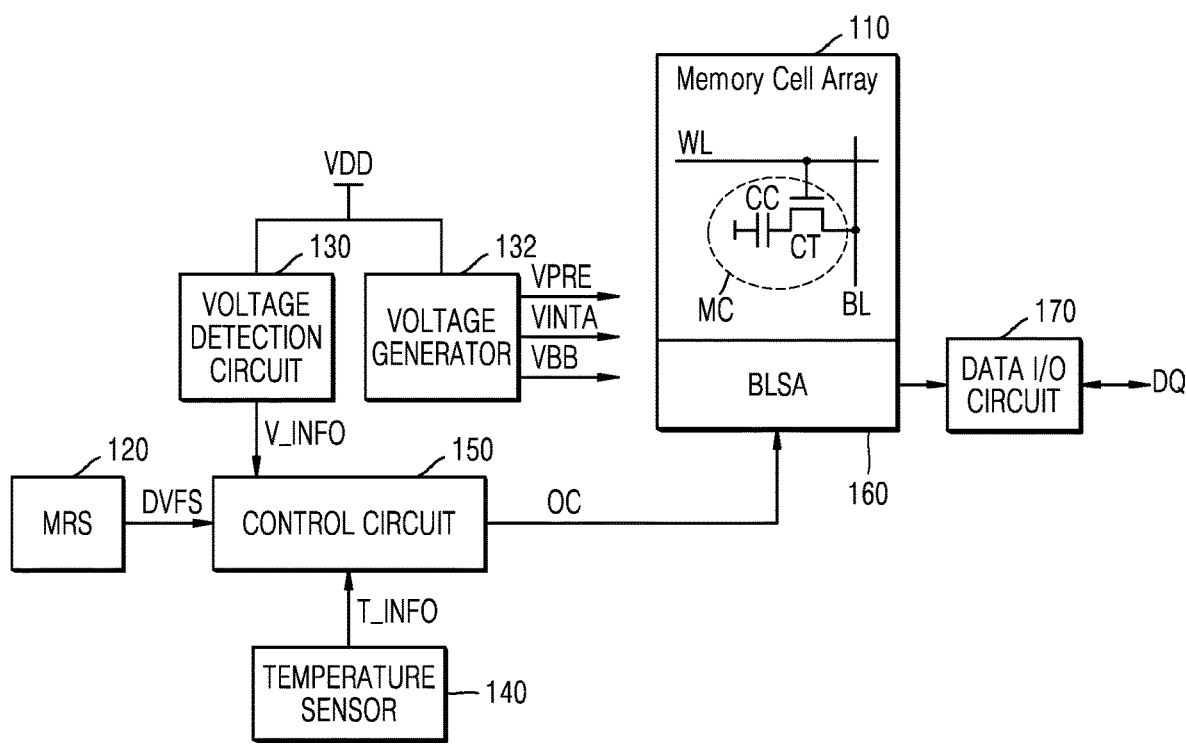
FIG. 1 is a diagram conceptually illustrating a memory device according to embodiments.

FIG. 1 is a diagram conceptually illustrating a memory device 100 according to embodiments. Referring to FIG. 1, the memory device 100 includes a memory cell array 110, a mode register set (MRS) 120, a voltage detection circuit 130, a voltage generator 132, a temperature sensor 140, a control circuit 150, a sense amplifier 160, and a data input/output (I/O) circuit 170. Although not shown in FIG. 1, the memory device 100 may further include a row decoder, a word line driver, a column decoder, a read/write circuit, a clock circuit, an address buffer, a refresh circuit, and the like. The specific configuration of the memory device 100 shown in FIG. 1 does not represent or imply a limitation on the inventive concept.

The memory device 100 may include, for example, double data rate synchronous dynamic random access memory (DDR SDRAM), low power double data rate (LPDDR) SDRAM, graphics double data rate (GDDR) SDRAM, rambus dynamic random access memory (RDRAM), etc. Alternatively, the memory device 100 may be implemented as static RAM (SRAM), high bandwidth memory (HBM), or processor-in-memory (PIM). According to an embodiment, the memory device 110 may be implemented as a nonvolatile memory device. For example, the memory device 100 may be implemented as a flash memory or a resistive memory, such as phase change RAM (PRAM), magnetic RAM (MRAM), or resistive RAM (RRAM).

The memory cell array 110 includes a plurality of memory cells MC arranged in rows and columns. The memory cell array 110 includes a plurality of word lines WL and a plurality of bit lines BL connected to the memory cells MC. Each of the memory cells MC includes a cell transistor CT and a cell capacitor CC. A gate of the cell transistor CT is connected to one of the word lines WL arranged in a row direction of the memory cell array 110. One end of the cell transistor CT is connected to one of the bit lines BL arranged in a column direction of the memory cell array 110. The other end of the cell transistor CT is connected to the cell capacitor CC. The cell capacitor CC may store charges having a capacity corresponding to single-bit data (e.g., bit "0" or bit "1"). According to an embodiment, the cell capacitor CC may store charges having a capacity corresponding to multi-bit data (e.g., 2-bit data). The cell capacitor CC may be restored with an amount of charge corresponding to the capacity of each of single-bit data or multi-bit data.

The MRS 120 may be programmed to set a plurality of operating parameters, options, various functions, characteristics, and modes of the memory device 100. The MRS 120 may store a parameter code including appropriate bit values provided to a command/address (CA) bus of a memory bus when an MRS command is issued from a memory controller coupled to the memory device 100.

For example, the MRS 120 may be used to control a burst length, a read/write latency, a dynamic voltage and frequency scaling (DVFS) mode, and the like. The burst length may be provided to set a maximum number of column locations that may be accessed for read and/or write commands. The read/write latency may be provided to define a clock cycle delay between a read and/or write command and a first bit of valid output and/or input data.

The DVFS mode may be provided to reduce energy consumption of the memory device 100. When the DVFS mode is enabled, the memory device 100 may operate internal circuits from a VDD2H rail or a VDD2L rail. The VDD2H rail or the VDD2L rail may provide a power supply voltage for driving a core block of the memory device 100. For example, a voltage VDD2H may be set to a typical value of about 1.05 V, and may be set in a voltage range of a minimum value of 1.01 V and a maximum value of 1.12 V. The voltage VDD2L may be set to be in the same voltage range as that of a voltage VDD2H in the case of a single-core power rail, and may be set to be less than a VDD2H voltage level in the case of a dual-core power rail. For the dual-core power rail, the voltage VDD2L may be set to a typical value of around 0.9 V, and may be set to be in a voltage range of a minimum value of 0.87 V and a maximum value of 0.97 V. The voltage VDD2H may be designed to drive the sense amplifier 160 that is one of the core blocks of the memory device 100.

The voltage detection circuit 130 may detect a level of a power supply voltage VDD provided to the memory device 100. The power supply voltage VDD may include the voltages VDD2H, VDD2L, and VDDQ. The VDDQ voltage is a power supply voltage for driving I/O buffers of the memory device 100, and may be set to be less than the VDD2H voltage level. For convenience of description, the power supply voltage VDD may be referred to as the voltage VDD2H associated with the sense amplifier 180. The power supply voltage VDD and the voltage VDD2H may be used with each other.

The voltage detection circuit 130 may detect the VDD2H voltage level and output voltage information V_INFO regarding a detected voltage level. The voltage information V_INFO regarding the VDD2H voltage level may indicate a certain value of the VDD2H voltage level. For example, the voltage information V_INFO may be specified as 0.95 V, 0.98 V, 1.0 V, 1.02 V, 1.05 V, 1.12 V, or the like to be output. The voltage information V_INFO regarding the VDD2H voltage level may be provided to the control circuit 150 to be used to control the sense amplifier 160.

The voltage generator 132 may generate various internal voltages for driving circuits of the memory device 100. For example, the voltage generator 132 may generate a reference voltage, a high voltage, a bit line precharge voltage VBL, an internal power supply voltage VINTA, and a bulk bias voltage VBB using the power supply voltage VDD. The reference voltage may be used for comparison against a voltage of a signal received from the CA bus to determine a logic value of a signal received from the memory controller. A high voltage may have a higher voltage level than that of the power supply voltage VDD and may be used in a word line driver circuit for turning on an NMOS cell transistor connected to the word lines WL.

A bit line precharge voltage VPRE may be used to equalize a bit line BL and a complementary bit line BLB before the sense amplifier 160 senses a voltage difference between the bit line BL and the complementary bit line BLB. An internal power supply voltage VINTA may be used to provide first and second sensing driving signals LA and LAB of the sense amplifier 160. The sense amplifier 160 may sense and amplify the voltage difference between the bit line BL and the complementary bit line BLB according to the first and second sensing driving signals LA and LAB. A bulk bias voltage VBB may have a negative (−) voltage level lower than that of the power supply voltage VDD and may be used to increase a data retention time by increasing a threshold voltage Vth of the NMOS transistor. The bulk bias voltage VBB may be applied to a well region in which the NMOS transistor is formed, and may be often referred to as a back bias voltage.

The temperature sensor 140 may detect a temperature of the memory device 100 and output detected temperature information T_INFO. The temperature information T_INFO may indicate whether a temperature is high or low with respect to room temperature. The temperature information T_INFO may be provided to the control circuit 150 to be used to control the sense amplifier 160.

The control circuit 150 may control all operations of the memory device 100. The control circuit 150 may receive a command from the memory controller through the CA bus of the memory bus and generate control signals corresponding to the command. A memory operation may be performed at an operation timing of the memory device 100 by the control circuit 150. The control circuit 150 may generate internal control signals according to a read command and/or a refresh command of the memory controller and control the sense amplifier 160.

The control circuit 150 may control the operation of the sense amplifier 160 when the sense amplifier 160 senses data of the memory cell MC. When the sense amplifier 160 senses the data stored in the memory cell MC, the control circuit 150 may perform control to sequentially perform a pre-charge operation, an offset cancellation operation, a charge sharing operation, a sensing operation, and a restore operation. The control circuit 150 may control the components of the sense amplifier 160 shown in FIG. 2 to operate according to a timing diagram shown in FIG. 3. Advantageously, the control circuit 150 may vary an offset cancellation time at which an offset cancellation operation of the sense amplifier 160 is performed based on the voltage information V_INFO of the voltage detection circuit 130 and/or the temperature information T_INFO of the temperature sensor 140.

The sense amplifier 160 may sense data stored in the memory cell MC and transmit the sensed data to the data I/O circuit 170 to output the sensed data to the outside of the memory device 100 through data DQ pad(s). The data I/O circuit 170 may receive the data DQ to be written in the memory cells MC from the outside and may transmit the received data DQ to the memory cell array 110. The data I/O circuit 170 may output read data using a data line amplifier that receives and amplifies data sensed by the sense amplifier 160. The read data from the data I/O circuit 170 may be externally output through the data DQ pad(s).

Figure 2:
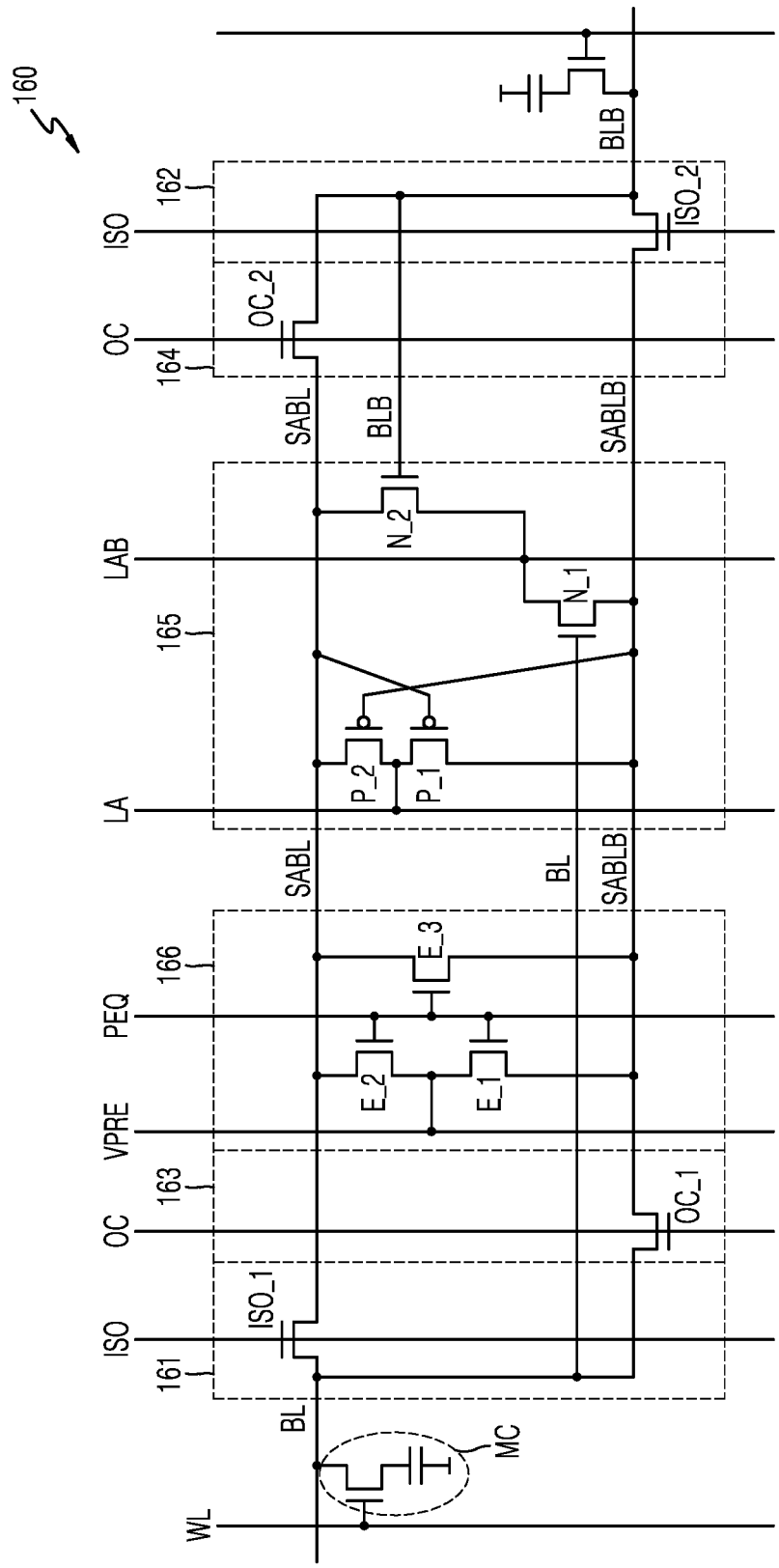
FIG. 2 is a circuit diagram illustrating a sense amplifier according to an embodiment.

Hereinafter, the components and operations of the sense amplifier 160 are described in detail through various embodiments. Referring to FIG. 2, the sense amplifier 160 may include first and second isolation units 161 and 162, first and second offset cancellation units 163 and 164, a sense amplifier circuit 165, and an equalizing circuit 166, connected as illustrated. Thus, the first isolation unit 161 may be connected between the bit line BL and a sensing bit line SABL, and the second isolation unit 162 may be connected between the complementary bit line BLB and a complementary sensing bit line SABLB. The first and second isolation units 161 and 162 may operate in response to an isolation signal ISO. The first isolation unit 161 may include a first isolation transistor ISO_1 that connects or disconnects the bit line BL and the sensing bit line SABL to or from each other in response to the isolation signal ISO. One end of the first isolation transistor ISO_1 may be connected to the bit line BL, the other end thereof may be connected to the sensing bit line SABL, and a gate thereof may be connected to the isolation signal ISO.

The second isolation unit 162 may include a second isolation transistor ISO_2 that connects or disconnects the complementary bit line BLB and the complementary sensing bit line SABLB to or from each other in response to the isolation signal ISO. One end of the second isolation transistor ISO_2 may be connected to the complementary bit line BLB, the other end thereof may be connected to the complementary sensing bit line SABLB, and a gate thereof may be connected to the isolation signal ISO.

The first offset cancellation unit 163 may be connected between the bit line BL and the complementary sensing bit line SABLB, and the second offset cancellation unit 164 may be connected between the complementary bit line BLB and the sensing bit line SABL. The first and second offset cancellation units 163 and 164 may operate in response to an offset cancellation signal OC. The first offset cancellation unit 163 may include a first offset cancellation transistor OC_1 that connects or disconnects the bit line BL and the complementary sensing bit line SABLB to/from each other in response to the offset cancellation signal OC. One end of the first offset cancellation transistor OC_1 may be connected to the bit line BL, the other end thereof may be connected to the complementary sensing bit line SABLB, and a gate thereof may be responsive to the offset cancellation signal OC. Similarly, the second offset cancellation unit 164 may include a second offset cancellation transistor OC_2 that connects or disconnects the complementary bit line BLB and the sensing bit line SABL to or from each other in response to the offset cancellation signal OC. One end of the second offset cancellation transistor OC_2 may be connected to the complementary bit line BLB, the other end thereof may be connected to the sensing bit line SABL, and a gate thereof may be responsive to the offset cancellation signal OC.

A sense amplifier circuit 165 may be connected between the sensing bit line SABL and the complementary sensing bit line SABLB, and may detect and amplify a voltage difference between the bit line BL and the complementary bit BLB according to the first and second sensing driving signals LA and LAB. The sense amplifier circuit 165 may include first and second PMOS transistors P_1 and P_2 and first and second NMOS transistors N_1 and N_2, connected as illustrated.

One end of the first PMOS transistor P_1 may be connected to the complementary sensing bit line SABLB, the other end thereof may be connected to a line of the first sensing driving signal LA, and a gate thereof may be connected to the sensing bit line SABL. One end of the second PMOS transistor P_2 may be connected to the sensing bit line SABL, the other end thereof may be connected to the line of the first sensing driving signal LA, and a gate thereof may be connected to the complementary sensing bit line SABLB.

One end of the first NMOS transistor N_1 may be connected to the complementary sensing bit line SABLB, the other end thereof may be connected to the line of the second sensing driving signal LAB, and a gate thereof may be connected to the bit line BL. One end of the second NMOS transistor N_2 may be connected to the sensing bit line SABL, the other end thereof may be connected to the line of the second sensing driving signal LAB, and a gate thereof may be connected to the complementary bit line BLB. The equalizing circuit 166 may be connected between the sensing bit line SABL and the complementary sensing bit line SABLB, and selectively equalize the sensing bit line SABL and the complementary sensing bit line SABLB in response to an equalizing signal PEQ. The equalizing circuit 166 may include first to third equalizing transistors E_1, E_2, and E_3.

One end of the first equalizing transistor E_1 may be connected to the line of the precharge voltage VPRE, the other end thereof may be connected to the complementary sensing bit line SABLB, and a gate thereof may be connected to the equalizing signal PEQ. One end of the second equalizing transistor E_2 may be connected to the line of the precharge voltage VPRE, the other end thereof may be connected to the sensing bit line SABL, and a gate thereof may be connected to the equalizing signal PEQ. One end of the third equalizing transistor E_3 may be connected to the sensing bit line SABL, the other end thereof may be connected to the complementary sensing bit line SABLB, and a gate thereof may be connected to the equalizing signal PEQ.

Figure 3:
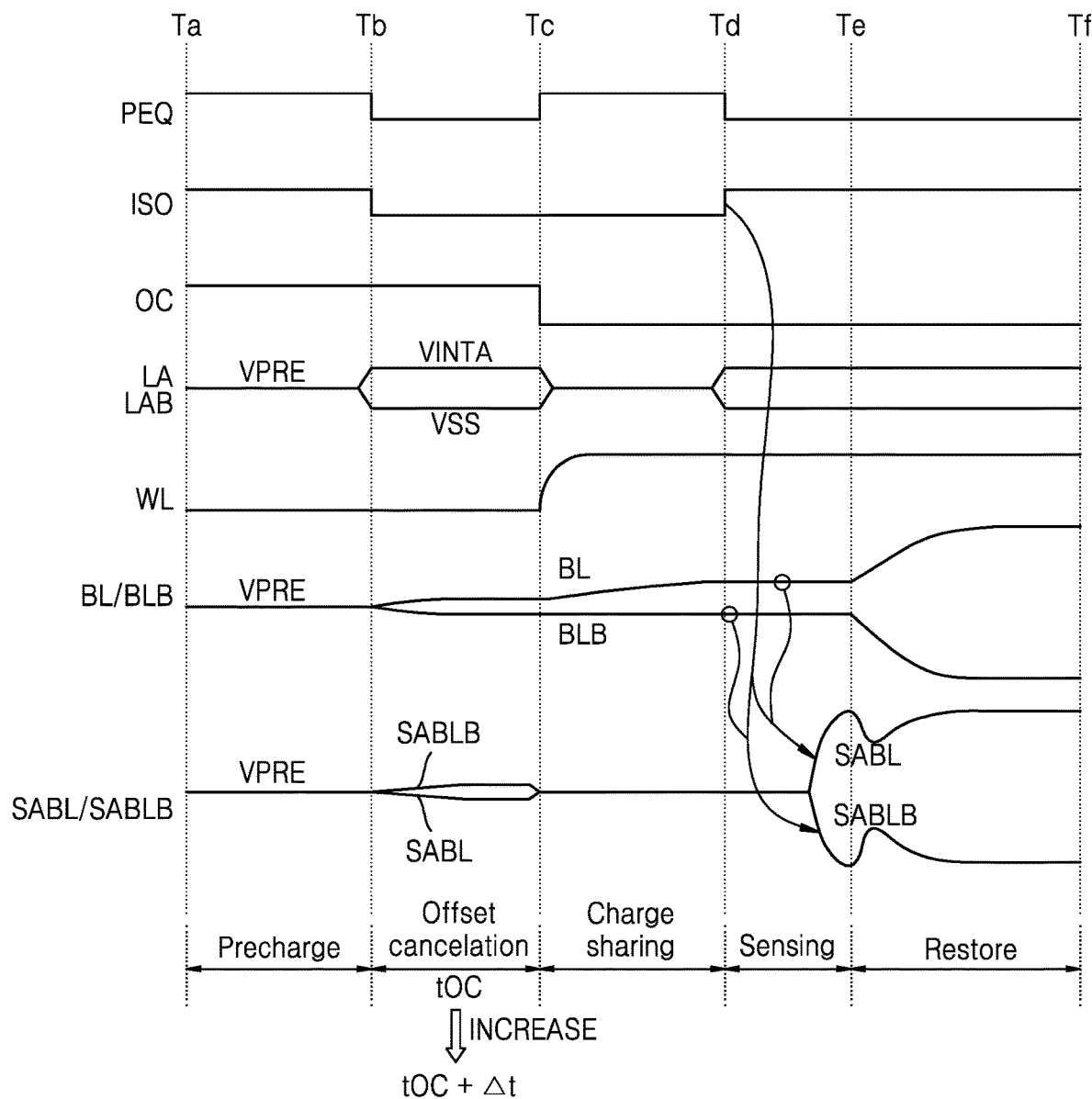
FIG. 3 is a timing diagram illustrating an operation of a sense amplifier according to an embodiment.

FIG. 3 is a timing diagram illustrating an operation of the sense amplifier 160 according to an embodiment. Referring to FIGS. 2 and 3, the sense amplifier 160 may sequentially perform the precharge operation, the offset cancellation operation, the charge sharing operation, the sensing operation, and the restore operation. As shown, during the first period Ta to Tb, the sense amplifier 160 performs a precharge operation using the equalizing circuit 166. Here, the equalizing signal PEQ, the isolation signal ISO, and the offset cancellation signal OC is logic high H, the first and second sensing driving signals LA and LAB have a precharge voltage VPRE level, and the bit line pair BL and BLB and the sensing bit line pair SABL and SABLB are equally precharged to the precharge voltage VPRE.

Advantageously, during a second period Tb to Tc, the sense amplifier 160 performs an offset cancellation operation using the first and second offset cancellation units 163 and 164. Here, the equalizing signal PEQ and the isolation signal ISO become logic low L. The first sensing driving signal LA increases from the precharge voltage VPRE level to the internal power supply voltage VINTA level, and the second sensing driving signal LAB decreases from the precharge voltage VPRE level to a ground voltage VSS level.

Within the sense amplifier 160, the complementary bit line BLB increases or decreases to a certain level compared to the bit line BL, so that the bit line BL has a certain voltage difference from the complementary bit line BLB. This voltage difference may be interpreted as an offset voltage resulting from undesirable offset noise. In response, a difference equivalent to the offset voltage between the bit line BL and the complementary bit line BLB and between the sensing bit line SBL and the complementary sensing bit line SBLB is stored, thereby canceling the offset noise of the sense amplifier 160. That is, the sense amplifier 160 may compensate for the offset noise using the offset cancellation operation.

Next, during a third period Tc to Td, the sense amplifier 160 performs the "memory cell" charge sharing operation. Here, the equalizing signal PEQ becomes logic high H, and the first and second sensing driving signals LA and LAB have the precharge voltage VPRE level, so that the sensing bit line pair SABL and SABLB are equilibrated to the precharge voltage VPRE. Here, the word line WL connected to the memory cell MC is activated to have a high voltage level. Charge sharing occurs between the charges stored in the cell capacitor CC of the memory cell MC and the charges stored on the bit line BL. When data '1' is stored in the memory cell MC, the voltage level of the bit line BL may increase by a certain level during the charge sharing operation, but when data '0' is stored in the memory cell MC, the voltage level of the bit line BL may decrease by a certain level during the charge sharing operation.

Then, during a fourth period Td to Te, the sense amplifier 160 performs the sensing operation. Here, the first sensing driving signal LA increases from the precharge voltage VPRE level to the internal power supply voltage VINTA level, and the second sensing driving signal LAB decreases from the precharge voltage VPRE level to the ground voltage level VSS. In addition, the equalizing signal PEQ may be disabled to logic low L. Based on the voltage difference between the bit line BL and the complementary bit line BLB, the sensing bit line SABL may be increased to the internal power supply voltage VINTA and the complementary sensing bit line SABLB may be decreased to the ground voltage VSS by the sense amplifying circuit 165.

Finally, during a fifth period Te to Tf, the sense amplifier 160 performs the restore operation. Here, the isolation signal ISO becomes logic high H, and the first and second isolation transistors ISO_1 and ISO_2 are in an ON state. The bit line pair BL and BLB and the sensing bit line pair SABL and SABLB may be connected to each other, the bit line BL increases to the voltage level of the sensing bit line SABL, and the voltage level of the bit line BL may be restored to the cell capacitor CC of the memory cell MC with an amount of charges corresponding to the voltage level of the bit line BL.

In FIG. 3, during the second period Tb to Tc, the offset cancellation operation is performed for an offset cancellation time tOC period. Here, the offset cancellation operation of the sense amplifier 160 may be performed while the offset cancellation signal OC is logic high H using the first sensing driving signal LA having the internal power supply voltage VINTA level and the second sensing driving signal LAB having the ground voltage VSS level. The offset cancellation time tOC may be defined as the time for the first sensing driving signal LA to have the internal power supply voltage VINTA level, the second sensing driving signal LAB to have the ground voltage VSS level, and the offset cancellation signal OC to be logic high H.

Meanwhile, the internal power supply voltage VINTA is generated from the power supply voltage VDD, for example, the voltage VDD2H, in the voltage generator 132 of FIG. 1, and the level of the internal power supply voltage VINTA may also be changed by a change in the voltage VDD2H. The change in the level of the internal power supply voltage VINTA may also affect the voltage level of the first sensing driving signal LA, so that the driving capability of the sense amplifier 160 may be changed. For example, the VDD2H voltage level may be lower than a typical value of 1.05 V specified in the SPEC specification of the memory device 100. The offset cancellation time tOC of the sense amplifier 160 may be designed to be optimized for the typical VDD2H voltage level of 1.05 V.

However, if the VDD2H voltage level is lower than the typical value of 1.05 V, the offset noise may not be completely canceled during the time interval defined by the tOC time (i.e., the time interval from Tb to Tc). Thus, a residue of the offset noise may remain and this residue may cause a sensing error within the sense amplifier 160 during the subsequent "memory cell" charge sharing operation and the following sensing (and amplification) operation. Moreover, this sensing error of the sense amplifier 160 may be amplified by a data line amplifying circuit of the data I/O circuit 170, and may be output as failed data and may cause the memory device 100 to malfunction. Accordingly, a system using the memory device 100 may experience a significant failure.

In order to cancel out at least most of the offset noise of the sense amplifier 160, it is necessary to control the tOC time to be longer than the nominal preset time by an additional (and adjustable) time $\Delta t$. Hereinafter, the components and operations of the control circuit 150 for completely canceling the offset noise of the sense amplifier 160 are described in detail through various embodiments.

FIGS. 4 to 10 are diagrams illustrating the control circuit 150 according to embodiments. It may be noted that the configuration of the control circuit 150 shown in FIGS. 4 to 10 is provided as an example, and is not necessarily an actual configuration. In addition, the configuration shown in FIGS. 4 to 10 collectively refers to an implementation in hardware, firmware, software, or combinations thereof to configure the control circuit 150. Hereinafter, the subscripts attached to reference numerals (e.g., a in 150a, b in 150b, c in 150c, d in 150d, e in 150e, and f in 150f) are for distinguishing between a plurality of circuits having the same function. Control circuits 150a to 150f of FIGS. 4 to 10 are described in connection with FIGS. 1 to 3.

Figure 4:
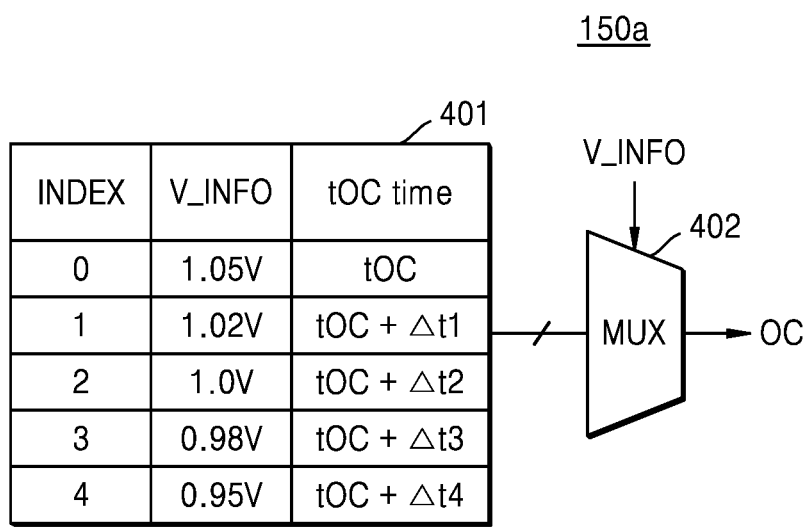
FIGS. 4 to 10 are diagrams illustrating control circuits according to embodiments.

Referring to FIG. 4, the control circuit 150a may include a register array 401 and a multiplexer (MUX) 402. The MUX 402 may receive the voltage information V_INFO for the VDD2H voltage level detected by the voltage detection circuit 130. The MUX 402 may be configured to output the offset control signal OC according to a corresponding offset cancellation time stored in the register array 401, in response to the voltage information V_INFO.

The register array 401 shows an example of storing five voltage values respectively corresponding to indices 0 to 4 as a non-limiting example. The five voltage values may be configured to be equal to a certain value of the voltage information V_INFO for the VDD2H voltage level detected by the voltage detection circuit 130, for example, 0.95 V, 0.98 V, 1.0 V, 1.02 V, and 1.05 V. The register array 401 may store an offset cancellation time corresponding to the certain voltage information V_INFO. When the voltage information V_INFO is the typical value of 1.05 V, the offset cancellation time may be set to the tOC value that is the optimal time for performing the offset cancellation operation of the sense amplifier 160. When the voltage information V_INFO is lower than the typical value of 1.05 V of the VDD2H voltage level, the offset cancellation time may be set to be longer than the tOC value.

For example, when the voltage information V_INFO is the VDD2H voltage level of 1.02 V, the offset cancellation time may be set to be longer than the tOC value by the time $\Delta t1$ to be stored as a value of $tOC+\Delta t1$ value. When the voltage information V_INFO is the VDD2H voltage level of 1.0 V, the offset cancellation time may be set to be longer than the tOC value by time $\Delta t2$ to be stored as a value of $tOC+\Delta t2$. The time $\Delta t2$ may be set to be longer than the time $\Delta t1$. When the voltage information V_INFO is the VDD2H voltage level of 0.98 V, the offset cancellation time may be set to be longer than the tOC value by the time $\Delta t3$ to be stored as a value of $tOC+\Delta t3$. The $\Delta t3$ time may be set to be longer than the time $\Delta t2$. For a case in which the voltage information V_INFO is the VDD2H voltage level of 0.95 V, the offset cancellation time may be set longer than the tOC value by the time $\Delta t4$ and stored as a value of $tOC+\Delta t4$. The time $\Delta t4$ may be set to be longer than the time $\Delta t3$.

The control circuit 150a of the present embodiment may output the offset control signal OC having a variable tOC time according to the offset cancellation time output from the register array 401, in response to the voltage information V_INFO from the voltage detection circuit 130.

Figure 5:
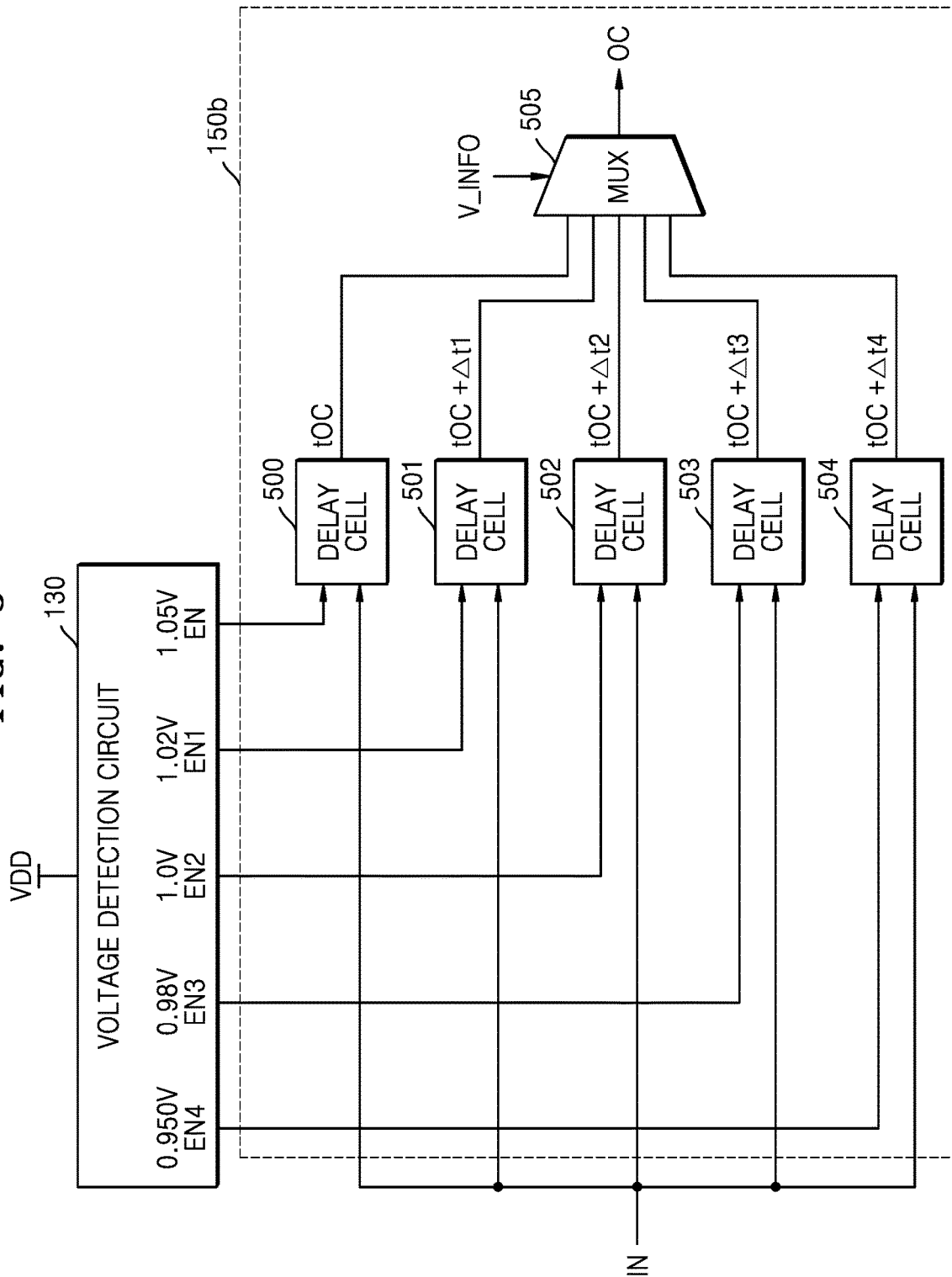

Referring to FIG. 5, the control circuit 150b may be connected to the voltage detection circuit 130 and configured to output the offset control signal OC according to an offset cancellation time set in a plurality of delay cells 500 to 504 (i.e., first to fifth delay cells 500 to 504) enabled selectively by first to fifth enable signals EN to EN4 corresponding to the voltage information V_INFO from the voltage detection circuit 130, respectively.

The voltage detection circuit 130 may be configured to detect the power supply voltage VDD, for example, the VDD2H voltage level, and activate the respective enable signals EN to EN4 corresponding to the voltage information V_INFO regarding the detected voltage level. When the voltage information V_INFO indicates the VDD2H voltage level of 1.05 V, the voltage detection circuit 130 may activate the first enable signal EN. The voltage detection circuit 130 may activate the second enable signal EN1 when the voltage information V_INFO indicates the VDD2H voltage level of 1.02 V, may activate the third enable signal EN2 when the voltage information V_INFO indicates the VDD2H voltage level of 1.0 V, may activate the fourth enable signal EN3 when the voltage information V_INFO indicates the VDD2H voltage level of 0.98 V, and may activate the fifth enable signal EN4 when the voltage information V_INFO indicates the VDD2H voltage level of 0.95 V. The first to fifth enable signals EN to EN4 may be provided to the first to fifth delay cells 500 to 504 of the control circuit 150b respectively corresponding thereto and may enable the corresponding delay cells 500 to 504, respectively.

The control circuit 150b may include the delay cells 500 to 504 and a MUX 505 for controlling the offset cancellation time tOC of the sense amplifier 160. The first to fifth delay cells 500 to 504 may be connected in parallel to an input signal IN, and may delay the input signal IN for a delay time set in the corresponding delay cells 500 to 504. Each of the first to fifth delay cells 500 to 504 may be configured to be the same as the delay cell 600 shown in FIG. 6. The input signal IN may be an operation signal that causes the memory device 100 to perform an active operation in response to an active command received from the memory controller. According to an embodiment, the input signal IN may be an operation signal for performing a read operation or a write operation in relation to a read command or a write command. The input signal IN may be provided from the control circuit 150b that generates control signals in response to a command.

In order for the first to fifth delay cells 500 to 504 to provide an offset cancellation time tOC according to the voltage information V_INFO of the voltage detection circuit 130, a delay time of a delay element 604 may be configured to have different values. The first delay cell 500 may be activated by the first enable signal EN and may be set to have a delay time of tOC. The second delay cell 501 may be activated by the second enable signal EN1 and may be set to have a delay time of tOC+Δt1. The third delay cell 502 may be activated by the third enable signal EN2 and may be set to have a delay time of tOC+Δt2. The fourth delay cell 503 may be activated by the fourth enable signal EN3 and may be set to have a delay time of tOC+Δt3. The fifth delay cell 504 may be activated by the fifth enable signal EN4 and may be set to have a delay time of tOC+Δt4.

The multiplexer 505 may receive the voltage information V_INFO for the power supply voltage VDD detected by the voltage detection circuit 130, for example, the VDD2H voltage level. The MUX 505 may be configured to set the offset cancellation time as the delay time of the delay cells 500 to 504 enabled in response to the voltage information V_INFO, and output the offset control signal OC according to the set offset cancellation time.

The control circuit 150b of the present embodiment may be configured to output the offset control signal OC according to the offset cancellation time set in the delay cells 500 to 504 selectively enabled respectively by the enable signals EN to EN4 corresponding to the voltage information V_INFO of the voltage detection circuit 130.

Figure 6:
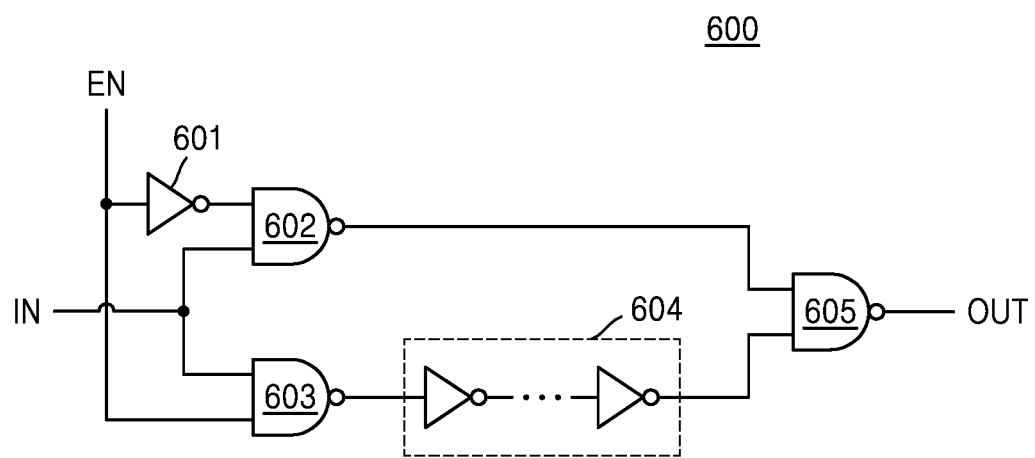

Referring to FIG. 6, the delay cell 600 may be activated by the first enable signal EN, and may delay the input signal IN for a certain period of time to produce an output signal OUT. The delay cell 600 may include an inverter 601, first to third NAND gates 602, 603, and 605, and the delay element 604. The inverter 601 may be input the enable signal EN, the first NAND gate 602 may be input an output of the inverter 601 and the input signal IN, and the second NAND gate 603 may be input the enable signal EN and the input signal IN. An output of the second NAND gate 603 may be delayed by the delay element 604 to be input to the third NAND gate 605. The third NAND gate 605 may be input an output of the first NAND gate 602 and the delayed output of the second NAND gate 603 and produce the output signal OUT.

The control circuit 150b of FIG. 5 may apply a bulk bias voltage VBB having a negative (−) voltage level to the NMOS transistors included in the delay cells 500 to 504 according to the voltage information V_INFO of the voltage detection circuit 130. As a threshold voltage Vth of each of the NMOS transistors increases by the bulk bias voltage VBB, the delay time set in the delay cells 500 to 504 may increase. The control circuit 150b may be configured to change an offset cancellation time set in the delay cells 500 to 504 using the bulk bias voltage VBB and output the offset control signal OC according to the changed offset cancellation time, before outputting the offset control signal OC according to the offset cancellation time set in the delay cells 500 to 504 selectively enabled respectively by the enable signals EN to EN4.

Figure 7:
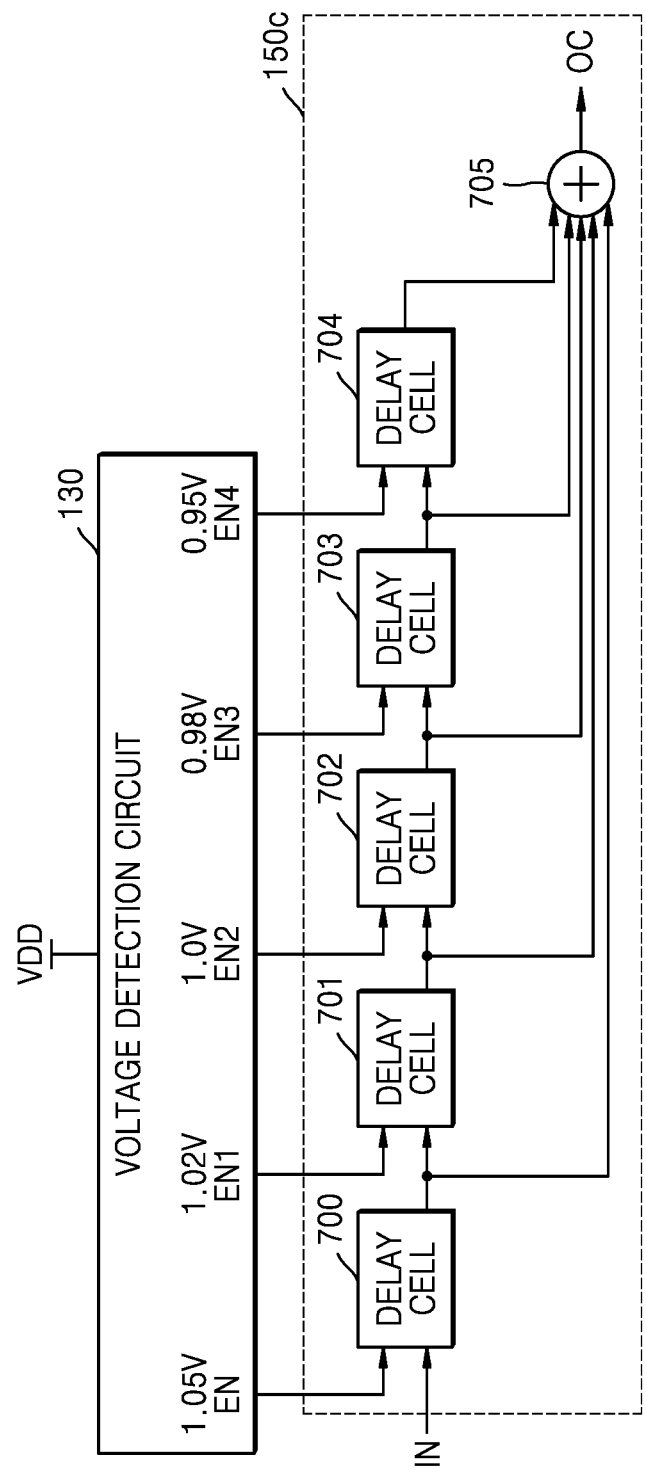

Referring to FIG. 7, the control circuit 150c may be configured to output the offset control signal OC according to an offset cancellation time set in a plurality of delay cells 700 to 704 connected to the voltage detection circuit 130 and continuously enabled respectively by certain enable signals EN to EN4 corresponding to the voltage information V_INFO of the voltage detection circuit 130.

The voltage detection circuit 130 may be configured to detect the power supply voltage VDD, for example, the VDD2H voltage level and activate the certain enable signals EN to EN4 in response to the voltage information V_INFO related to the detected voltage level. When the voltage information V_INFO indicates the VDD2H voltage level of 1.05 V, the voltage detection circuit 130 may output the activated first enable signal EN. The voltage detection circuit 130 may output the activated first and second enable signals EN and EN1 when the voltage information V_INFO indicates the VDD2H voltage level of 1.02 V, may output the activated first to third enable signals EN, EN1, and EN2 when the voltage information V_INFO indicates the VDD2H voltage level of 1.0 V, may output the activated first to fourth enable signals EN, EN1, EN2, and EN3 when the voltage information V_INFO indicates the VDD2H voltage level of 0.98 V, and may output the activated first to fifth enable signals EN, EN1, EN2, EN3, and EN4 when the voltage information V_INFO indicates the VDD2H voltage level of 0.95 V. The first to fifth enable signals EN to EN4 may be provided to the delay cells 700 to 704 of the control circuit 150c, and may enable the corresponding delay cells 700 to 704, respectively.

The control circuit 150c may include the delay cells 700 to 704 and an adder 705 for controlling the offset cancellation time tOC of the sense amplifier 160. The plurality of delay cells 700 to 704 connected in series may delay the input signal IN by a delay time set in the enabled delay cell. The delay cells 700 to 704 may be configured to be the same as the delay cell 600 shown in FIG. 6. The adder 705 may be configured to add up the delay time(s) of the enabled delay cell(s) among the delay cells 700 to 704, set the added delay time as the offset cancellation time, and output the offset control signal OC according to the set offset cancellation time.

Figure 8:
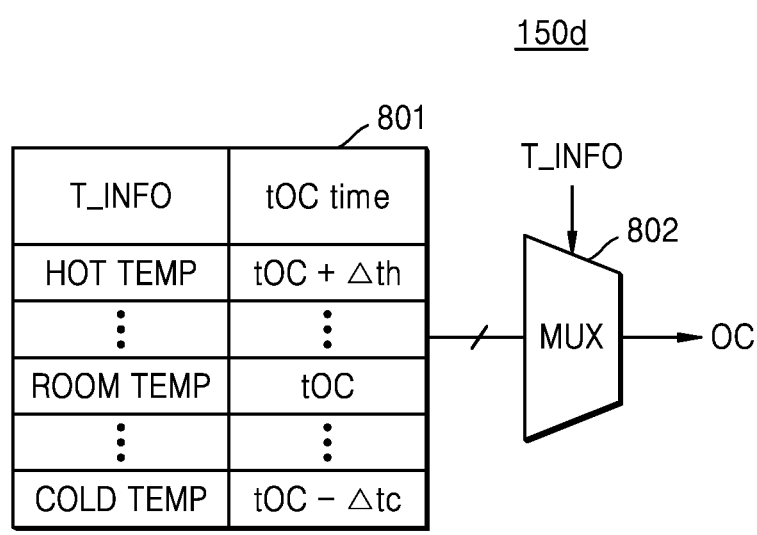

Referring to FIG. 8, the control circuit 150d may include a register array 801 that stores the offset cancellation time corresponding to the temperature information T_INFO of the temperature sensor 140 and a MUX 802. The register array 801 may store offset cancellation times corresponding to room temperature, high temperature higher than room temperature, and low temperature lower than room temperature. According to an embodiment, the register array 801 may have various temperature points other than room temperature, high temperature, and low temperature. The register array 801 may store the offset cancellation time for the temperature information T_INFO of room temperature as a tOC value, which is an optimal time for performing the offset cancellation operation of the sense amplifier 160.

The register array 801 may set the offset cancellation time for the temperature information T_INFO of the high temperature to be longer than the tOC value by the time Δth and store a tOC+Δth value. According to an embodiment, the register array 801 may set the offset cancellation time for the temperature information T_INFO of the high temperature to be shorter than the tOC value by the time Δth and store a tOC−Δth value. The register array 801 may set the offset cancellation time for the temperature information T_INFO of the low temperature to be shorter than the tOC value by the time Δtc and store a tOC−Δtc value. According to an embodiment, the register array 801 may set the offset cancellation time for the temperature information T_INFO of the low temperature to be longer than the tOC value by the time Δtc and store a tOC+Δtc value.

The MUX 802 may receive the temperature information T_INFO detected by the temperature sensor 140. The multiplexer 802 may be configured to output an offset control signal OC according to a corresponding offset cancellation time stored in the register array 801, in response to the temperature information T_INFO.

The control circuit 150*d* of the present embodiment may output an offset control signal OC having a variable tOC time according to the offset cancellation time output from the register array 801, in response to the temperature information T_INFO of the temperature sensor 140. According to an embodiment, the control circuit 150*d* may output an offset control signal OC having a variable tOC time according to the temperature information T_INFO using the delay cells and the bulk bias voltage VBB described above with reference to FIGS. 5 to 7.

Figure 9:
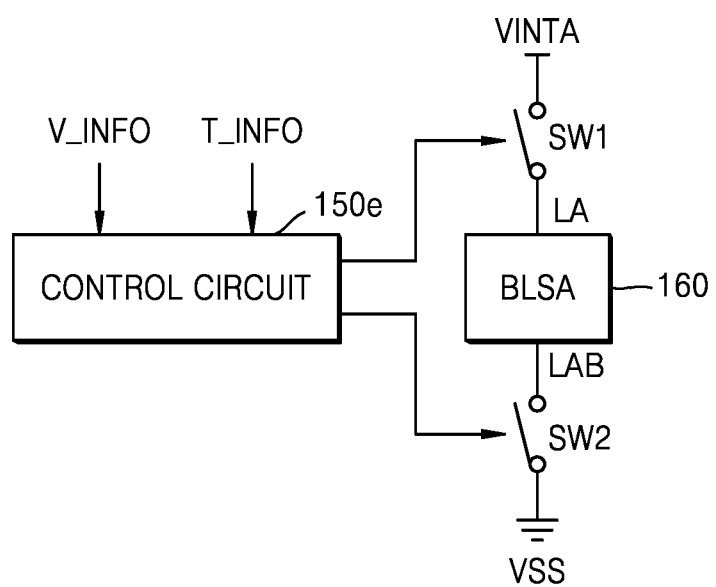

Referring to FIG. 9, the control circuit 150*e* may control first and second power switches SW1 and SW2 connected to the sense amplifier 160, based on the voltage information V_INFO of the voltage detection circuit 130 and/or the temperature information T_INFO of the temperature sensor 140. The first power switch SW1 may be connected between an internal power supply voltage VINTA line and a first sensing driving signal line LA, and the second power switch SW2 may be connected between a ground voltage VSS line and a second sensing driving signal LAB line. The sense amplifier 160 may perform an offset cancellation operation using the first sensing driving signal LA having the internal power supply voltage VINTA level and the second sensing driving signal LAB having the ground voltage VSS level while the offset cancellation signal OC is logic high H in the second period Tb to Tc of FIG. 3.

The control circuit 150*e* may control a time for which the first and second power switches SW1 and SW2 are in an ON state based on the voltage information V_INFO of the voltage detection circuit 130 and/or the temperature information T_INFO of the temperature sensor 140. The control circuit 150*e* may control a time for which the first and second power switches SW1 and SW2 are in an ON state to be long with respect to the voltage information T_INFO having the lowest VDD2H voltage level detected by the voltage detection circuit 130, and may control a time for which the first and second power switches SW1 and SW2 are in an ON state to be short with respect to the voltage information V_INFO having a level higher than the lowest VDD2H voltage level. The control circuit 150*e* may control a time for which the first and second power switches SW1 and SW2 are in an ON state to be long with respect to high temperature information T_INFO provided from the temperature sensor 140, and may control a time for which the first and second power switches SW1 and SW2 are in an ON state to be short with respect to low temperature information T_INFO. Accordingly, the offset cancellation time tOC may be controlled as the first sensing driving signal LA has the internal power supply voltage VINTA level and the second sensing driving signal LAB having the ground voltage VSS level increases or decreases.

According to an embodiment, the memory device 100 may include only one of the two first and second power switches SW1 and SW2. For example, the memory device 100 may include the first power switch SW1 connected between the internal power supply voltage VINTA and the first sensing driving signal LA or the second power switch SW2 connected between the ground voltage VSS and the second sensing driving signal LAB. The control circuit 150*e* may control the offset cancellation time tOC by controlling the first power switch SW1 or the second power switch SW2 based on the voltage information V_INFO of the voltage detection circuit 130 and/or the temperature information T_INFO of the temperature sensor 140.

Figure 10:
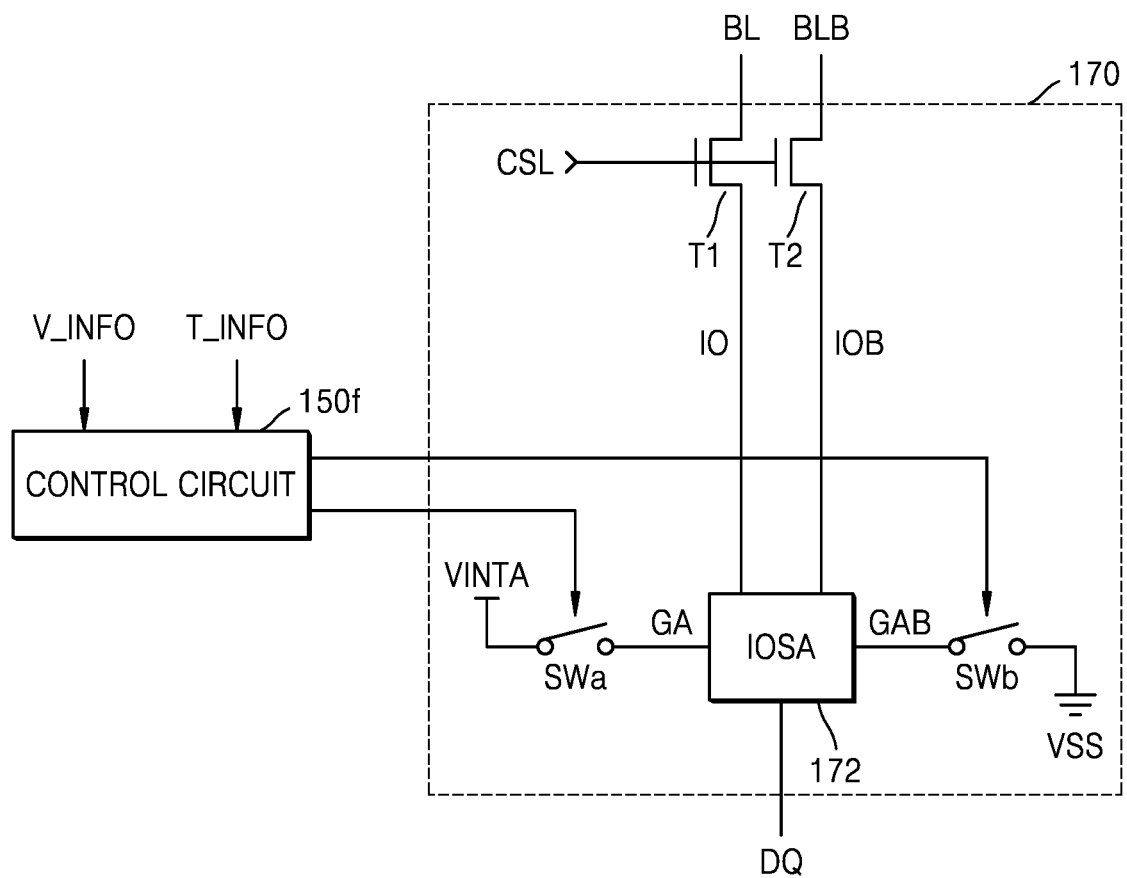

Referring to FIG. 10, the control circuit 150*f* may be connected to the data I/O circuit 170. The data I/O circuit 170 may include a I/O sense amplifier (IOSA) 172 to amplify a data signal having a small amplitude loaded in an i/O line pair 10 and 10B through a bit line pair BL and BLB and a column select transistor pair T1 and T2 from the sense amplifier 160. The column select transistor pair T1 and T2 may connect the bit line pair BL and BLB to the I/O line pair 10 and 10B in response to a column select signal CSL associated with a column address designating a memory cell MC of the memory cell array 110. The I/O line sense amplifier 172 may amplify data from the I/O line pair 10 and 10B using the first sensing driving signal GA and the second sensing driving signal GAB.

The control circuit 150*f* may control the first and second power switches SWa and SWb connected to the I/O line sense amplifier 172 based on the voltage information V_INFO from the voltage detection circuit 130 and/or the temperature information T_INFO from the temperature sensor 140. The first power switch SWa may be connected between the internal power supply voltage VINTA line and the first sensing driving signal GA line, and the second power switch SWb may be connected between the ground voltage VSS line and the second sensing driving signal line GAB.

The control circuit 150*f* may control a time for which the power switches SWa and SWb connected to the I/O line sense amplifier 172 are in an ON state based on the voltage information V_INFO from the voltage detection circuit 130 and/or the temperature information T_INFO from the temperature sensor 140. The control circuit 150*f* may control a time for which the power switches SWa and SWb are in an ON state to be long with respect to the voltage information T_INFO having the lowest VDD2H voltage level detected by the voltage detection circuit 130, and may control a time for which the power switches SWa and SWb are in an ON state to be short with respect to the voltage information V_INFO higher than the lowest VDD2H voltage level. The control circuit 150*f* may control a time for which the power switches SWa and SWb are in an ON state to be long with respect to high temperature information T_INFO provided from the temperature sensor 140, and control a time for which the power switches SWa and SWb are in an ON state to be short with respect to low temperature information T_INFO. Accordingly, a sensing time of the I/O line sense amplifier 172 may be controlled as the first sensing driving signal GA has the internal power supply voltage VINTA level and a time for which the second sensing driving signal GAB has the ground voltage VSS level increases or decreases.

Figure 11:
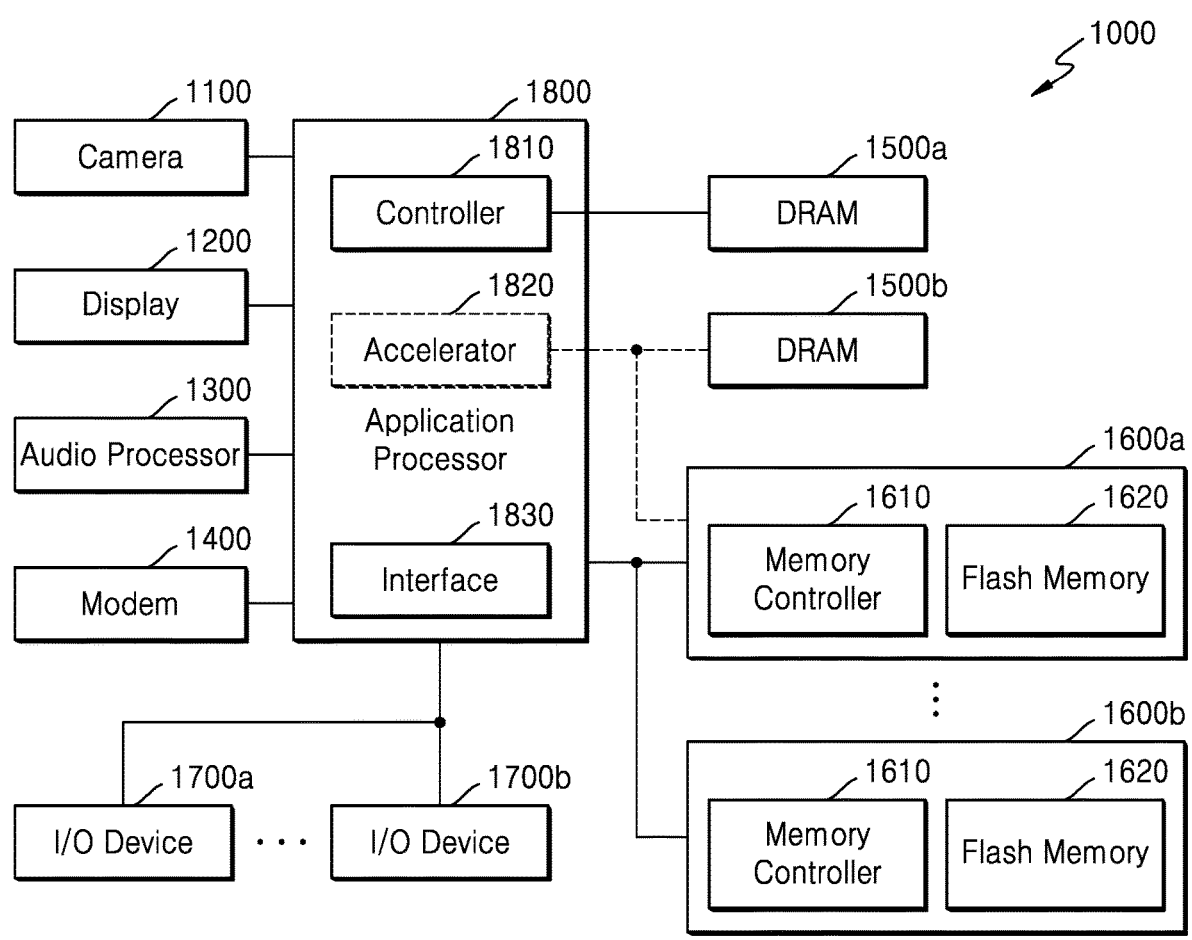
FIG. 11 is a block diagram illustrating a system including a memory device according to embodiments.

FIG. 11 is a block diagram illustrating a system 1000 including a memory device according to embodiments. Referring to FIG. 11, the system 1000 may include a camera 1100, a display 1200, an audio processor 1300, a modem 1400, DRAMs 1500*a* and 1500*b*, flash memory devices 1620*a* and 1620*b*, I/O devices 1700*a* and 1700*b*, and an application processor (AP) 1800. The system 1000 may be implemented as a laptop computer, a mobile phone, a smartphone, a tablet personal computer (PC), a wearable device, a healthcare device, or an Internet Of Things (IOT) device. In addition, the system 1000 may be implemented as a server or a PC.

The camera 1100 may capture a still image or a video according to a user's control, and may store the captured image/video data or transmit the same to the display 1200. The audio processor 1300 may process audio data included in the flash memory devices 1600*a* and 1600*b* or content of a network. The modem 1400 modulates and transmits a signal to transmit/receive wired/wireless data to/from a receiver, and in this case, the receiver may demodulate a received signal to restore the original signal. The I/O devices 1700a and 1700b may respectively include devices providing a digital input and/or output function, such as a universal serial bus (USB) or storage, a digital camera, a secure digital (SD) card, a digital versatile disc (DVD), a network adapter, and a touch screen.

The AP 1800 may control the overall operation of the system 1000. The AP 1800 may control the display 1200 to display a portion of the content stored in the flash memory devices 1600a and 1600b. When a user input is received through the I/O devices 1700a and 1700b, the AP 1800 may perform a control operation corresponding to the user input. The AP 1800 may include an accelerator block that is a dedicated circuit for an artificial intelligence (AI) data operation, or may include an accelerator 1820 separately from the AP 1800. DRAM 1500b may be additionally mounted in the accelerator block or the accelerator 1820. The accelerator 1820 may include a graphics processing unit (GPU) that is a function block specializing in performing graphic data processing, a neural processing unit (NPU) that is a block specializing in performing AI calculation and inference, and a data processing unit (DPU) that is a block specializing in data transfer, as function blocks specializing in performing a certain function of the AP 1800.

The system 1000 may include DRAMs 1500a and 1500b. The AP 1800 may control the DRAMs 1500a and 1500b through setting of a command and mode register (MRS) conforming to the Joint Electron Device Engineering Council (JEDEC) standard, or perform communication by setting a DRAM interface protocol to use company-certain functions, such as low voltage/high speed/reliability, and a cyclic redundancy check (CRC)/error correction code (ECC) function. For example, the AP 1800 may communicate with the DRAM 1500a through an interface conforming to JEDEC standards, such as LPDDR4 and LPDDR5, and the accelerator block or the accelerator 1820 may perform communication by setting a new DRAM interface protocol to control the DRAM 1500b for an accelerator having a bandwidth higher than that of the DRAM 1500a.

Although only DRAMs 1500a and 1500b are illustrated in FIG. 11, the inventive concept is not limited thereto, and any memory, such as phase change RAM (PRAM), static RAM (SRAM), magnetic RAM (MRAM), resistive RAM (RRAM), ferroelectric (FRAM), or hybrid RAM, may be used as long as a bandwidth, a response speed, and voltage conditions of the AP 1800 or the accelerator 1820 are met. The DRAMs 1500a and 1500b have relatively smaller latency and bandwidth than the I/O devices 1700a and 1700b or the flash memory devices 1600a and 1600b. The DRAMs 1500a and 1500b may be initialized when the system 1000 is powered on, and may be loaded with an operating system and application data to be used as temporary storage locations for the operating system and application data or may be used as execution spaces for various pieces of software code.

In the DRAMs 1500a and 1500b, the four fundamental arithmetic operations of addition/subtraction/multiplication/division operations, vector operations, address operations, or fast Fourier transform (FFT) operations may be performed. In addition, a function for execution used for inference may be performed in the DRAMs 1500a and 1500b. Here, the inference may be performed in a deep learning algorithm using an artificial neural network. The deep learning algorithm may include a training operation of learning a model through various pieces of data and an inference operation of recognizing data with the learned model. As an embodiment, an image captured by the user through the camera 1100 is signal-processed and stored in the DRAM 1500b, and the accelerator block or the accelerator 1820 may perform an AI data operation to recognize data using the data stored in the DRAM 1500b and a function used in inference.

The system 1000 may include a plurality of storages or the flash memory devices 1600a and 1600b having a greater capacity than that of the DRAMs 1500a and 1500b. The accelerator block or the accelerator 1820 may perform a training operation and an AI data operation by using the flash memory devices 1600a and 1600b. In an embodiment, the flash memory devices 1600a and 1600b may perform a training operation, which is performed by the AP 1800 and/or the accelerator 1820, and the inference AI data operation more efficiently using a computing device included in the memory controller 1610. The flash memory devices 1600a and 1600b may store pictures captured through the camera 1100 or data transmitted through a data network. For example, the flash memory devices 1600a and 1600b may store augmented reality/virtual reality, high definition (HD), or ultra high definition (UHD) content.

In the system 1000, the DRAMs 1500a and 1500b may include the sense amplifier and the control circuit described above with reference to FIGS. 1 to 10. Each of the DRAMs 1500a and 1500b may further include a voltage detection circuit providing voltage information by detecting a power supply voltage level and/or a temperature sensor providing temperature information by detecting a temperature. In each of the DRAMs 1500a and 1500b, the sense amplifier may perform an offset cancellation operation to have an offset voltage difference between a bit line and a complementary bit line connected to the memory cells of the memory cell array, sample and detect a change in voltage of the bit line, and control voltages of a sensing bit line and a complementary sensing bit line based on the detected change in voltage. The control circuit in each of the DRAMs 1500a and 1500b may vary an offset cancellation time for which an offset cancellation operation is performed in the sense amplifier based on voltage information and/or temperature information.

While the inventive concept has been particularly shown and described with reference to embodiments thereof, it will be understood that various changes in form and details may be made therein without departing from the spirit and scope of the following claims.

What is claimed is:
1. A method of operating a memory device, comprising:
   precharging a pair of true and complementary bit lines to an equivalent voltage concurrently with precharging a pair of true and complementary sense bit lines within a sense amplifier to the equivalent voltage; then
   transferring charge associated with offset noise from the true bit line to the complementary sense bit line concurrently with transferring charge associated with the offset noise from the complementary bit line to the true sense bit line, so that a voltage difference is established between the true sense bit line and the complementary sense bit line, wherein the memory device is configured such that a duration of said transferring charge associated with the offset noise is adjusted in response to changes in magnitude of an internal power supply voltage within the memory device; then
   reading a logic state of a memory cell within the memory device by transferring charge between the memory cell and the true bit line, concurrently with equilibrating voltages on the true and complementary sense bit lines; and then sensing and amplifying a voltage difference between the true and complementary sense bit lines in response to activating an amplifier circuit within the sense amplifier, said amplifier circuit electrically connected to the true and complementary sense bit lines and responsive to voltage signals developed on the true and complementary bit lines during said reading.

2. The method of claim 1, wherein said transferring charge comprises:
transferring charge associated with the offset noise from the true bit line to the complementary sense bit line via a first offset cancellation transistor having a first current carrying terminal electrically connected to the true bit line, a second current carrying terminal electrically connected to the complementary sense bit line, and a gate terminal responsive to an offset cancellation signal; and
transferring charge associated with the offset noise from the complementary bit line to the true sense bit line via a second offset cancellation transistor having a first current carrying terminal electrically connected to the complementary bit line, a second current carrying terminal electrically connected to the true sense bit line, and a gate terminal responsive to the offset cancellation signal.

3. The method of claim 1, wherein the memory device is configured such that a duration of said transferring charge associated with the offset noise varies in response to changes in magnitude of an internal power supply voltage within the memory device.

4. The method of claim 3, wherein the memory device includes true and complementary sensing driving signal lines (LA/LAB), which are electrically connected to the amplifier circuit within the sense amplifier; and wherein said transferring charge associated with the offset noise comprises driving LA at the internal power supply voltage.

5. The method of claim 4, wherein said sensing and amplifying a voltage difference comprises driving LA at the internal power supply voltage.

6. The method of claim 5, wherein during said reading a logic state, LA and LAB are both held at a precharge voltage level having a magnitude less than the internal power supply voltage and greater than a ground reference voltage.

7. The method of claim 1, wherein the duration of said transferring charge associated with the offset noise varies inversely in response to changes in magnitude of an internal power supply voltage within the memory device.

8. A memory device, comprising:
a sense amplifier including: (i) an equalization circuit, which is electrically connected to a true sense bit line and a complementary sense bit line and responsive to an equalization signal, (ii) an amplifier circuit, which is electrically connected to the true sense bit line and the complementary sense bit line and responsive to true and complementary sensing driving signals (LA/LAB), (iii) a first isolation transistor electrically connected in series between a true bit line and the true sense bit line, and a second isolation transistor electrically connected in series between a complementary bit line and the complementary sense bit line, and (iv) a first offset cancellation transistor having a first current carrying terminal electrically connected to the true bit line, a second current carrying terminal electrically connected to the complementary sense bit line, and a gate terminal responsive to an offset cancellation signal, and a second offset cancellation transistor having a first current carrying terminal electrically connected to the complementary bit line, a second current carrying terminal electrically connected to the true sense bit line, and a gate terminal responsive to the offset cancellation signal; and
a control circuit configured to generate the offset cancellation signal during an operation to reduce offset noise on the true and complementary bit lines, which precedes an operation to read a logic state of a memory cell onto the true bit line,
wherein the control circuit is configured such that a duration of the operation to reduce offset noise on the true and complementary bit lines is adjusted inversely in response to changes in magnitude of an internal power supply voltage within the memory device.

9. A memory device comprising:
a memory cell array including a plurality of memory cells;
a voltage detection circuit configured to detect a power supply voltage level of the memory device;
a sense amplifier connected to a bit line and a complementary bit line of the memory cell array, said sense amplifier configured to perform: (i) an offset cancellation operation to reduce an offset voltage difference between the bit line and the complementary bit line, (ii) sample and detect a voltage change of the bit line, and (iii) adjust voltages of a sensing bit line and a complementary sensing bit line based on the detected voltage change; and
a control circuit configured to adjust a duration of the offset cancellation operation based on a magnitude of the detected power supply voltage.

10. The memory device of claim 9, wherein the control circuit is configured to generate an offset cancellation signal for performing the offset cancellation operation to be activated for a first offset cancellation time, when the voltage information of the voltage detection circuit is a typical power supply voltage level defined in a specification of the memory device.

11. The memory device of claim 10, wherein the control circuit is configured to generate a control signal in response to a command of the memory device and generate the offset cancellation signal using delay cells that delay the control signal.

12. The memory device of claim 11, wherein the command comprises an active command, a read command, or a write command applied to the memory device.

13. The memory device of claim 11, wherein the control circuit is configured to set the offset cancellation signal to be activated for a second offset cancellation time that is longer than the first offset cancellation time, when the voltage information of the voltage detection circuit is lower than the typical power supply voltage level.

14. The memory device of claim 13, wherein the control circuit is configured to change the second offset cancellation time by applying a bulk bias voltage to NMOS transistors included in the delay cells, and activate the offset control signal according to the changed second offset cancellation time.

15. The memory device of claim 9, wherein the control circuit includes a register array storing the offset cancellation time corresponding to each of certain voltage levels of the voltage information.

16. The memory device of claim 9,
wherein the sense amplifier is further configured to perform the offset cancellation operation using a first sensing driving signal having an internal power supply voltage level and a second sensing driving signal having a ground voltage level; and wherein the control circuit is configured to vary the offset cancellation time by controlling a first power switch connected between a ground voltage line and a second sensing driving signal line based on the voltage information of the voltage detection circuit.

17. The memory device of claim 16, wherein the control circuit is configured to vary the offset cancellation time by controlling a second power switch connected between an internal power supply voltage line and a first sensing driving signal line.

18. The memory device of claim 9, further comprising:
an input/output (I/O) line sense amplifier configured to amplify data loaded in an I/O line pair connected to a bit line pair of the sense amplifier in response to a column selection signal; and
wherein the control circuit is configured to vary the offset cancellation time by controlling a power switch connected to the I/O line sense amplifier based on the voltage information of the voltage detection circuit.

* * * * *